United States Patent [19]
Gawlik

[11] Patent Number: 5,396,931
[45] Date of Patent: Mar. 14, 1995

[54] MOUNTING OF ORIFICE PLATES

[75] Inventor: Daniel Gawlik, Odessa, Tex.

[73] Assignee: Precision Flow, Inc., Odessa, Tex.

[21] Appl. No.: 39,925

[22] Filed: Mar. 29, 1993

[51] Int. Cl.6 .............................................. F15D 1/02
[52] U.S. Cl. ........................................ 138/44; 138/40
[58] Field of Search ................ 138/40, 44; 277/206 R

[56] References Cited

U.S. PATENT DOCUMENTS

| | | | |
|---|---|---|---|
| 1,731,404 | 10/1929 | Wetherill | 138/44 |
| 1,958,854 | 5/1934 | Kellett | 138/44 |
| 2,062,584 | 12/1936 | Langdon | 138/44 |
| 2,407,951 | 9/1946 | Daniel | 138/44 |
| 2,455,120 | 11/1948 | Hamer | 138/44 |
| 4,410,010 | 10/1983 | Van Scoy | 138/44 |
| 4,478,251 | 10/1984 | Sanchez | 138/44 |
| 4,557,296 | 12/1985 | Byrne | 138/40 |
| 4,593,915 | 6/1986 | Seger et al. | 138/44 |
| 4,633,911 | 1/1987 | Lohn | 277/206 R |
| 5,042,531 | 8/1991 | Foster et al. | 138/40 |
| 5,069,252 | 12/1991 | Kendrick et al. | 138/40 |
| 5,085,250 | 2/1992 | Kendrick | 138/44 |
| 5,094,272 | 3/1992 | Foster | 138/44 |
| 5,186,474 | 2/1993 | Jacobs | 138/44 |

Primary Examiner—James E. Bryant, III
Attorney, Agent, or Firm—Wendell Coffee

[57] ABSTRACT

Thin metal adaptor rings fit over the elastomeric seal rings holding an orifice plate within a fitting. The thin metal rings have an inside diameter equal to the inside diameter of the pipe line and fitting. Therefore, the inside diameter is maintained without variations as previously resulted from protrusion or recess tolerances of the elastomeric seal rings. The seal ring is modified with notches to hold the thin metal adaptor rings in the desired position.

10 Claims, 2 Drawing Sheets

MOUNTING OF ORIFICE PLATES

CROSS REFERENCE TO RELATED APPLICATION

None, however, Applicant filed Disclosure Document Number 320,514 on Nov. 9, 1992 which document concerns this application; therefore, by separate paper it is respectfully requested that the document be retained and acknowledgment thereof made by the Examiner. (MoPEP 1706)

BACKGROUND OF THE INVENTION (1) Field of the Invention

This invention relates to fluid flow measurement and more particularly to the mounting of orifice plates in fluid pipe lines.

(2) Description of the Related Art

The measurement of the flow of fluids by orifices in the pipe lines is old and well known. Tens of thousands of fittings for such have been sold and are in commercial use.

Typically, a fitting for such use includes a structure having an inside diameter equal to and co-axial with a pipe line inside diameter. The fitting will have a seat slot therein by which an orifice plate mounted within a seal ring may be inserted. The ring seal will have an inside annular surface. The orifice plate will fit within a recess in the inside annular surface.

The accuracy of the measurement will be effected by the precision by which the orifice is mounted within the fitting. For example, KENDRICK, U.S. Pat. No. 5,085,250, describes the effect that lack of concentricity of the orifice within the orifice plate to the inside diameter of the fitting will have. KELLETT, U.S. Pat. No. 1,958,854 recognizes the desirability of having a uniform inside diameter along and adjacent to the orifice plate itself.

Recent changes have been made by the API 14.3 specifications of orifice seal ring protrusion and recess tolerances. I.e., the variations in the protrusions or recesses can affect the accuracy of the flow determination within the pipe line.

SUMMARY OF THE INVENTION (1) Progressive Contribution to the Art

The invention disclosed in this application addresses the problem of variations of seal ring protrusions or recesses by providing adaptor rings so that the recesses and protrusions are minimized if not entirely eliminated.

Basically, the adaptor rings fit on either side of the orifice plate. The adaptor rings are of thin metal and have an inside diameter which is equal to the inside diameter of the fitting. The adaptor rings are held in place by radial flanges which are inserted within the same recess within the ring seal by which the orifice plate is inserted. I.e., it is known to the art, for example, KENDRICK, the orifice plate is inserted within a recess within the seal ring. Inasmuch as the seal rings as well as the orifices are normally made to precise dimensions, it is desirable to have notches cut in the sides of the recess to accommodate for the thickness of the radial flanges of the adaptor rings.

(2) Objects of this Invention

An object of this invention is to accurately measure the flow of fluids through a pipe line.

Another object of this invention is to provide adaptors and modified ring seals so that most of the orifice plate fittings and mountings may be converted to a more accurate device.

Further objects are to achieve the above with devices that are sturdy, compact, durable, lightweight, simple, safe, efficient, versatile, ecologically compatible, energy conserving, and reliable, yet inexpensive and easy to manufacture, install, and maintain.

Other objects are to achieve the above with a method that is rapid, versatile, ecologically compatible, energy conserving, efficient, and inexpensive, and does not require highly skilled people to install, and maintain.

Further objects are to achieve the above with a product that is easy to store, has a long storage life, is safe, versatile, efficient, stable and reliable, yet is inexpensive and easy to manufacture, install and maintain.

The specific nature of the invention, as well as other objects, uses, and advantages thereof, will clearly appear from the following description and from the accompanying drawings, the different views of which are not necessarily scale drawings.

Figure 1:
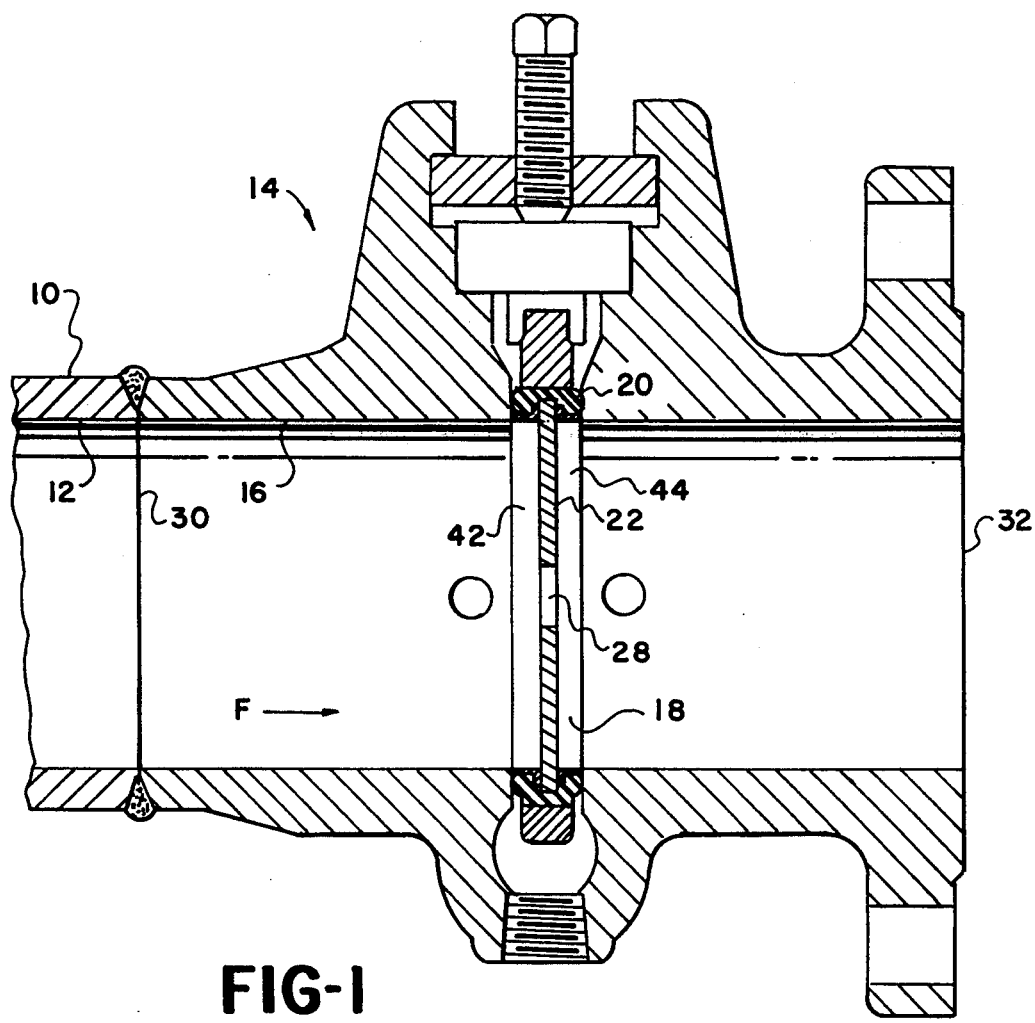
FIG. 1 is an axial sectional view of an orifice plate mounting according to this invention.
Figure 2:
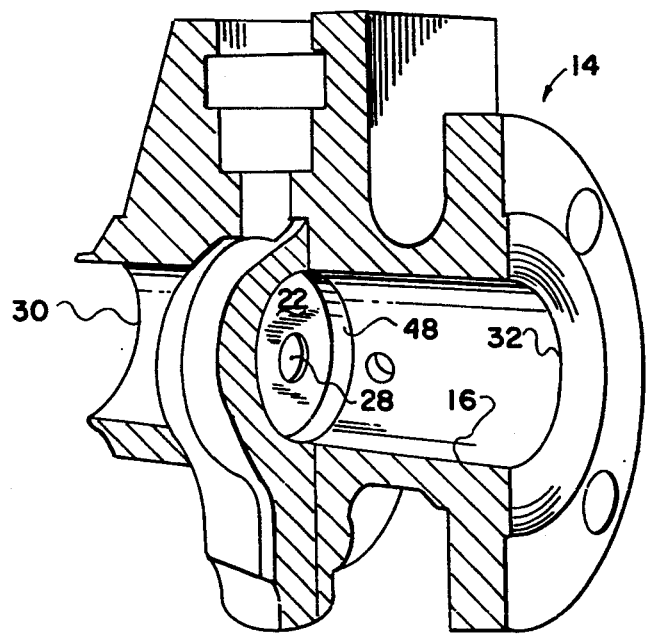
FIG. 2 is a perspective view partially cut away to show the mounting.
Figure 3:
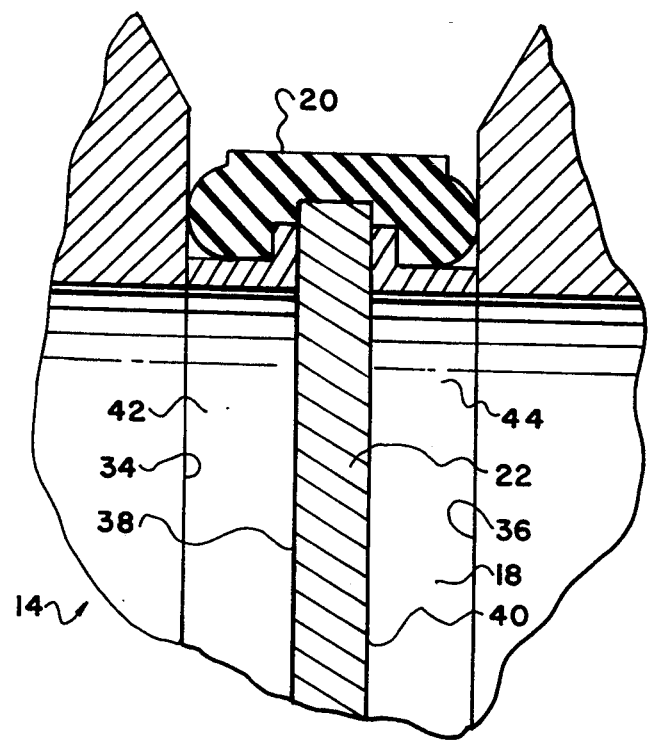
FIG. 3 is an axial sectional view of a portion of the mounting to a greatly enlarged scale.

As an aid to correlating the terms of the claims to the exemplary drawing(s), the following catalog of elements and steps is provided:

W width, relaxed
D depth
F arrow
SW slot width
RW ring width
RH radial height
10 pipe line
12 pipe line inside diameter
14 fitting
16 fitting inside diameter
18 seat slot
20 ring seal
22 orifice plate
24 ring seal inside annular surface
26 ring seal recess
28 orifice
30 first upstream end (fitting)
32 second downstream end (fitting)
34 first upstream surface (slot)
36 second downstream surface (slot)
38 first upstream face (plate)
40 second downstream face (plate)
42 adaptor upstream ring
44 adaptor downstream ring
46 cylindrical circumferential flange
48 inside diameter
50 distal end
52 radial flange
54 radial face
56 outer diameter
58 upstream notch
60 downstream notch

DESCRIPTION OF THE PREFERRED EMBODIMENTS

Figure 4:
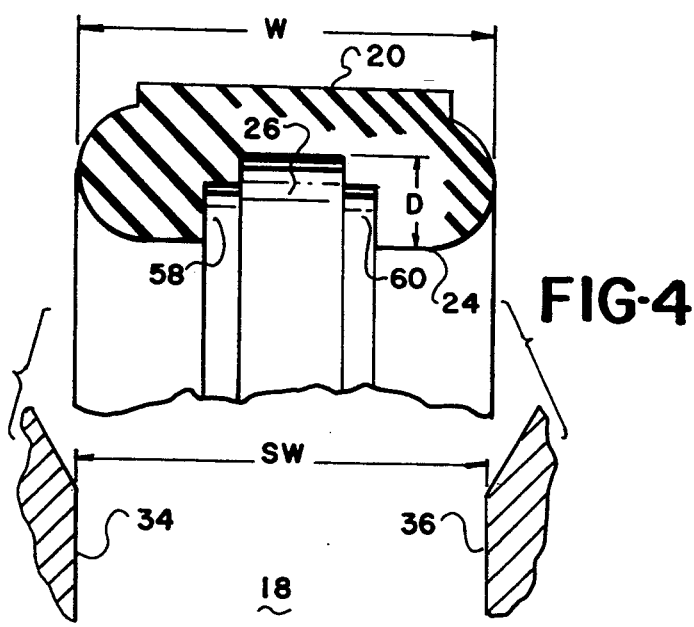
FIG. 4 is an exploded view of a portion of FIG. 3 showing only the ring seal and slot.

Referring more particularly to the drawing, there may be seen pipe line 10 which has pipe line inside diameter 12. It will be understood that the pipe line is shown at the inlet of fitting 14 only. However, it will be understood that the pipe line would continue from the flange but it is not shown for conciseness and clarity of the description. The fitting has an inside diameter 16 which is equal to the pipe line inside diameter. The fitting includes seat slot 18 which has slot width "SW" (FIG. 4). Ring seal 20 is within the seat slot 18. Orifice plate 22 is within the ring seal 20. The ring seal has annular inside surface 24 which is cylindrical. Ring seal recess 26 extends into the ring seal from the surface 24. The recess 26 has a certain depth "D" (FIG. 4). The ring seal also has a certain relaxed width "W". Relaxed width means the width of the ring seal when it is not compressed as when it is within the seat slot 18.

To orient the different elements it will be understood that there is a certain flow as shown by the arrow "F" through the pipe line 10, fitting 12, and orifice 28, within orifice plate 22. Therefore the fitting 14 has first end or upstream end 30 as well as second end or downstream end 32. Likewise the seat slot 18 has first surface or upstream stream surface 34 as well as second surface or downstream surface 36. The orifice plate has first or upstream face 38 as well as second or downstream face 40.

Those with skill in the art will understand that this detailed description, to this point, describes elements in combination that are old and well known to the art before this invention. As discussed above, the accuracy of the measurement of the flow "F" depends upon having a smooth and uniform cylindrical surface of the inside of the pipe line and fitting adjacent to the orifice plate 22. With the elastomeric seals 20, this was difficult to achieve because the seals would either protrude into the bore of the fitting, or there would be a recess within the walls of the fitting immediately adjacent to the orifice plate.

Figure 5:
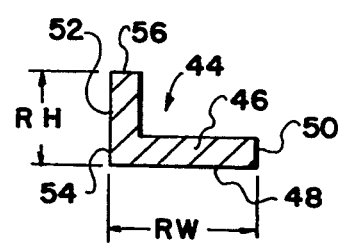
FIG. 5 is a cross-sectional detail of the adaptor rings.

This invention provides a remedy for this problem by the provision of two adaptor rings 42 and 44. As may be seen in the drawing adaptor ring 42 would be a first or upstream ring. Adaptor ring 44 would be a second or downstream ring. However, it will be understood that these two are identical and that it is only their orientation with respect to the orifice plate 22 that makes them distinct. It may also be seen that the adaptor rings have two legs forming an L-shape cross section (FIG. 5).

Since the two adaptor rings 42 and 44 are identical, the detailed description describes either ring 42 or 44. The adaptor ring has cylindrical circumferential flange 46 and radial flange 52 in the form of legs of the L-shaped cross section. The circumferential flange 46 has inside diameter 48 which is equal to the inside diameter of the fitting and pipe line. The circumferential flange 46 has distal end 50. Radial flange 52 has radial face 54 which is opposite to the distal end 50. The adaptor rings has ring width "RW" which is the distance from the face 54 to the distal end 50. Radial height "RH" is the distance from the inside diameter of the adaptor ring to outer diameter 56 of the radial flange 52.

The ring seal 20 of this invention is modified by the provision of upstream notch 58 and downstream notch 60 within the ring seal recess 26. These two notches are identical and width of the notches is about equal to the thickness of the radial flange 52. The extent of each notch from the inside annular surface 24 is about one half the depth "D" of the recess 26.

In use, the orifice plate 22 is placed within the recess 26. The upstream adaptor ring 42 is placed with the radial face 54 against the upstream face 38 of the orifice plate. The radial flange 52 of the upstream adaptor ring will be inserted into the upstream notch 58. The downstream adaptor ring 44 will be placed with the radial face 54 against the downstream face 40 of the orifice plate. Also, the radial flange 52 will be inserted into the downstream notch 60.

As stated previously, the relaxed width "W" of the ring seal 20 will be slightly greater than the slot width "SW" of the slot 18.

Therefore when the ring seal 20 is inserted into the seat slot 18 it will be compressed slightly. However, the dimensions are such that the distance from the distal end 50 of the upstream ring to the distal end 50 of the downstream ring will be slightly less than the slot width "SW". However, because of the construction of the seal ring the adaptor ring will be maintained close or in contact with the orifice plate face. There will be a small or slight recess between the fitting and the adaptor plate but this will be negligible particularly with respect to the accuracy of the flow determination.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. In combination with an orifice plate with a seal in a fitting having an inside diameter, said fitting in a fluid pipe line, said pipe line having a pipe line inside diameter equal to the inside diameter of the fitting, the improvement comprising:
    a) two circular adaptor rings, each having substantially a L-shaped cross section
        i) a cylindrical, circumferential flange with an inside diameter formed from one leg of the L-shaped cross section,
        ii) the inside diameter of the circumferential flange equal to the inside diameter of the pipe line and fitting, and
        iii) a radial flange formed from the other leg of the L-shaped cross section with a radial face and an inside diameter co-axial with and equal to the inside diameter of the circumferential flange,
    b) the radial face of the radial flange of one adaptor ring contacting an upstream face of the orifice plate, and
    c) the radial face of the radial flange of the other adaptor ring contacting a down stream face of the orifice plate.

2. The structural combination as defined in claim 1 wherein:
    d) said orifice plate, seal, fitting, pipe line, and adaptor rings are co-axial.

3. The structural combination as defined in claim 1 further comprising:

d) said seal having an annular recess from the inside diameter thereof,
e) said orifice plate snugly fitting within said annular recess,
f) said annular recess having a circular notch on each side thereof,
g) the radial flange of one of said adaptor rings fitting in one notch and the radial flange of the other said adaptor ring fitting in the other of said notches.

4. The structural combination as defined in claim 3 further comprising:
h) the circumferential flange of each adaptor having an axial width,
j) said seal having an axial width,
k) said orifice plate having an axial thickness, and
l) the sum of the axial thickness of the orifice plate and the axial width of the two adaptor rings being less than the axial width of the seal.

5. The structural combination as defined in claim 3 wherein
h) the seal is elastomeric.

6. The structural combination as defined in claim 1 wherein each of said adaptor rings has a distal end on the circumferential flange opposite the radial face, and further comprising:
d) a small negligible recess between the fitting and the distal end.

7. The structural combination as defined in claim 6 wherein:
e) said orifice plate, seal, fitting, pipe line, and adaptor rings are co-axial.

8. The structural combination as defined in claim 6 further comprising
e) said seal having an annular recess from the inside diameter thereof,
f) said orifice plate snugly fitting within said annular recess,
g) said annular recess having a circular notch on each side thereof,
h) the radial flange of one of said adaptor rings fitting in one notch and the radial flange of the other said adaptor ring fitting in the other of said notches.

9. The structural combination as defined in claim 8 further comprising:
j) the circumferential flange of each adaptor having an axial width,
k) said seal having an axial width,
l) said orifice plate having an axial thickness, and
m) the sum of the axial thickness of the orifice plate and the axial width of the two adaptor rings being less than the axial width of the seal ring.

10. The structural combination as defined in claim 8 wherein:
j) the seal ring is elastomeric.

* * * * *